(12) United States Patent
Heavlin

(10) Patent No.: US 6,366,822 B1
(45) Date of Patent: Apr. 2, 2002

(54) STATISTICAL PROCESS WINDOW DESIGN METHODOLOGY

(75) Inventor: William D. Heavlin, El Granada, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/130,528

(22) Filed: Aug. 4, 1998

(51) Int. Cl.$^7$ ............................................... G05B 13/02
(52) U.S. Cl. ........................................ 700/31; 700/121
(58) Field of Search ................................. 700/121, 103, 700/109, 31, 117, 29; 716/4

(56) References Cited

U.S. PATENT DOCUMENTS

| | | | | |
|---|---|---|---|---|
| 5,301,118 A | * | 4/1994 | Heck et al. | 700/109 |
| 5,319,564 A | * | 6/1994 | Smayling et al. | 703/13 |
| 5,418,974 A | * | 5/1995 | Craft et al. | 716/2 |
| 5,526,293 A | * | 6/1996 | Mozumder et al. | 716/19 |
| 5,646,870 A | * | 7/1997 | Krivokapic et al. | 716/4 |
| 5,655,110 A | * | 8/1997 | Krivokapic et al. | 716/19 |
| 5,719,796 A | * | 2/1998 | Chen | 700/103 |
| 5,787,269 A | * | 7/1998 | Hyodo | 703/13 |

OTHER PUBLICATIONS

M. D. McKay and R. J. Beckman, "Using Variance to identify Important Inputs," 1994 ASA Proceedings, Section on Physical and Engineering Sciences, Toronto, Aug. 1994.
S. Kaplan and L. Karklin, "Calibration of Lithography Simulator by Using Substitute Patterns," Proceedings on Optical/Laser Microlithography VI, SPIE 1927, pp. 847–858, 1993.
C. Mack and E. Charrier, "Yield Modeling for Photolithography," Proceedings of OCG Mircolithography Seminar, pp. 171–182, 1994.
TMA Depict, Two–Dimensional Process Simulation Program for Deposition, Etching, and Photolithography, version 3.0, Technology Modeling Associates, Inc., Palo Alto, California, 1993.
"Predicting Manufacturing Variabilities for Deep micron Technologies: Integration of Process, Device, and Statistical Simulations, " in Simulation of Semiconductor Devices and Processes, 5, S. Selberherr, H. Stippel and E. Strasser, eds, pp. 229–232, Springer–Verlag, New York, 1993.
W. D. Heavlin and G.P. Finnegan, "Dual Space Algorithms for Designing Space–filing Experiments, " Interface 1994, Research Triangle, North Carolina, Jun. 1994.
Genichi Taguchi, "Introduction to Quality Control," p. 75 (Asian Productivity Organization, 1986).
Mandel, J., "The Statistical Analysis of Experimental Data," Chapter 12, Interscience Publishers, Wiley & Sons, New York, 1964.
A. B. Owen, "Controlling Correlations in Latin Hypercube Samples," Journal of the American Statistical Association, vol. 89, No. 428, pp. 1517–1522, Dec. 1994.

(List continued on next page.)

*Primary Examiner*—William Grant
*Assistant Examiner*—Edward F. Gain, Jr.
(74) *Attorney, Agent, or Firm*—Fliesler Dubb Meyer & Lovejoy LLP

(57) ABSTRACT

A method of defining a toleranced process based on a nominal process, applicable to any manufacturing process wherein the output is dependent on a process having a number of input factors which are subject to variation, and have a mean and standard deviation. The method comprises the steps of: representing the variability of the response of a system to the current variability of at least one of the factors and at least one tightening factor; evaluating the components against a schedule of tightening factors in an array; modeling the output of the evaluation using interpolation to determine a mathematical function defining the toleranced process; and applying at least one of the models to a fabrication system to complete the toleranced process.

32 Claims, 11 Drawing Sheets

OTHER PUBLICATIONS

W. D. Heavlin, "Variance Components and Computer Experiments," 1994 ASA Proceedings, Section on Physical and Engineering Sciences, Toronto, Aug. 1994.

A. R. Neureuther and F. H. Dill, "Photoresist Modeling and Device Fabrication Applications," Optical and Acoustical Microelectronics, pp. 223–247, Polytechnic Press, New York, 1974.

F. H. Dill, J. A. Tuttle, A. R. Neureuther, "Modeling Positive Photoresist," Proceedings of the Kodak Microelectronics Seminar, pp. 24–31, 1974.

C. Mack, "Development of Positive Photoresists," Journal of the Electrochemical Society, vol. 134, pp. 148–152, Jan. 1987.

M. Stein, "Large Sample Properties of Simulations using Latin Hypercube Sampling," Technometrics, vol. 29, No. 2, pp. 143–151, May 1987.

William D. Heavlin and Luigi Capodieci, "Calibration and Computer Experiments," 1997 American Statisical Association Proceedings, Section on Physical and Engineering Sciences, pp. 58–63, Anaheim, Aug. 1997.

B. D. Ripley, "Spatial Statistics," pp. 44–75, Wiley, New York, 1981.

* cited by examiner

| TIGHTENING FACTORS | $\lambda_1$ | $\lambda_2$ | $\lambda_3$ | $\cdots$ | $\lambda_F$ |
|---|---|---|---|---|---|
| Exp D | 1 | 1 | 1 | $\cdots$ | 1 |
| Focus | 0 | 1 | 1 | $\cdots$ | 1 |
| PR Thk | 1 | 0 | 1 | $\cdots$ | 1 |
| BARC | 1 | 1 | 0 | $\cdots$ | 1 |
| $\vdots$ | $\vdots$ | $\vdots$ | $\vdots$ | $\ddots$ | $\vdots$ |
| Devt | 1 | 1 | 1 | $\cdots$ | 0 |

*FIG. 3A (Prior Art)*

| factor excluded (f) | Sample | LHC-based $S_f$ | $S_{(f)}^2 = S_0^2 - S_f^2$ | percent variation |
|---|---|---|---|---|
| exposure | (1) | 0.01293 | $0.010152^2$ | 38.14 |
| focus | (2) | 0.01526 | $0.006124^2$ | 13.88 |
| MaskCD | (3) | 0.01620 | $0.002781^2$ | 2.86 |
| prThk | (4) | 0.01647 | $-.000997^2$ | -0.37 |
| BARC | (5) | 0.01628 | $0.002309^2$ | 1.97 |
| PEB | (6) | 0.01262 | $0.010530^2$ | 41.04 |
| dev time | (7) | 0.01621 | $0.002726^2$ | 2.75 |
| sum (additive) | | | $0.016459^2$ | 100.28 |
| no factors excluded | (0) | 0.016438 | 0.000000 | 100.00 |
| interactions | | | | 0.28 |

SIMPLE AMV FOR ANNULAR CENTER CD (AnnCD)

SIMPLE AMV - EXAGGERATION OF THIRD AND HIGHER ORDER INTERACTIONS

FIG. 6A

ASML_NARROW 7R x 3C

| 0 | 1 mean | 2 stdev | 3 effort |
|---|--------|---------|----------|
| 1 E | 11.00 | 0.183333 | 0.9 |
| 2 F | -0.20 | 0.166667 | 0.9 |
| 3 M | 0.22 | 0.002200 | 0.9 |
| 4 R | 0.78 | 0.001667 | 0.9 |
| 5 B | 110.00 | 1.666667 | 0.9 |
| 6 P | 90.0 | 0.166667 | 0.9 |
| 7 D | 66.00 | 0.366667 | 0.9 |

40 →

INPUT

FIG. 6B

R_ANNCD_CENTER 210R x 4C
r_annCD_center

| 0 try | 1 FACTORS | 2 factor | 3 STDEV | 4 MEAN |
|-------|-----------|----------|---------|--------|
| 1 | 1 | E | 0.015798 | 0.213972 |
| 2 | 1 | F | 0.016224 | 0.213999 |
| 3 | 1 | M | 0.016390 | 0.214033 |
| 4 | 1 | R | 0.016441 | 0.214119 |
| 5 | 1 | B | 0.016407 | 0.214104 |
| 6 | 1 | P | 0.015785 | 0.214042 |
| 7 | 1 | D | 0.016392 | 0.214051 |
| 8 | 2 P | E | 0.015118 | 0.213901 |
| 9 | 2 P | F | 0.015563 | 0.213929 |
| 10 | 2 P | M | 0.015735 | 0.213961 |
| 11 | 2 P | R | 0.015792 | 0.214047 |
| 12 | 2 P | B | 0.015752 | 0.214033 |
| 13 | 2 P | P | 0.015237 | 0.213984 |
| 14 | 2 P | D | 0.015738 | 0.213980 |
| ⋮ | | | ⋮ | |
| 204 | 30 PEPEPEPEPEPFEPFEPFEPFEP | E | 0.006967 | 0.212542 |
| 205 | 30 PEPEPEPEPEPFEPFEPFEP | F ← 0.006960 | 0.212523 |
| 206 | 30 PEPEPEPEPEPFEPFEPFEP | M | 0.006989 | 0.212470 |
| 207 | 30 PEPEPEPEPEPFEPFEPFEP | R | 0.007093 | 0.212562 |
| 208 | 30 PEPEPEPEPEPFEPFEPFEP | B | 0.007005 | 0.212554 |
| 209 | 30 PEPEPEPEPEPFEPFEPFEP | P | 0.006972 | 0.212554 |
| 210 | 30 PEPEPEPEPEPFEPFEPFEP | D | 0.006994 | 0.212491 |

50 ⤴

OUTPUT

\# type "r_anncd_center"[205,1]
PEPEPEPEPEPFEPFEPFEPFEPFEP &F
\#

E ||||  ||||  |
F ||||  ||
P ||||  ||||  ||

Interactive SPW Dialog

| COL. | | ExpD | Focus | MaskCD | prThk | BARC | PEB | dev time | RESULTING CONTROL |
|---|---|---|---|---|---|---|---|---|---|
| 1 | reSpec | 0.31381 | 0.47830 | 1.00000 | 1.00000 | 1.00000 | 0.28243 | 1.00000 | 0.103544 |
| 2 | relax F | 0.31381 | 0.81000 | 0.90000 | 0.90000 | 0.90000 | 0.28243 | 0.90000 | 0.111536 |
| 3 | tighten all | 0.25000 | 0.81000 | 0.81000 | 0.81000 | 0.81000 | 0.25000 | 0.81000 | 0.103152 |
| 4 | relax F | 0.25000 | 0.90000 | 0.81000 | 0.81000 | 0.81000 | 0.25000 | 0.81000 | 0.105728 |
| 5 | tighten F | 0.25000 | 0.85000 | 0.81000 | 0.81000 | 0.81000 | 0.25000 | 0.81000 | 0.104289 |
| 6 | relax F | 0.25419 | 1.00000 | 0.81000 | 0.81000 | 0.81000 | 0.25419 | 0.81000 | 0.109273 |
| 7 | tighten all | 0.25419 | 1.00000 | 0.72900 | 0.72900 | 0.72900 | 0.25419 | 0.72900 | 0.107819 |
| 8 | tighten all | 0.25419 | 1.00000 | 0.65610 | 0.65610 | 0.65610 | 0.25419 | 0.65610 | 0.106526 |
| 9 | tighten all | 0.25419 | 1.00000 | 0.59049 | 0.59049 | 0.59049 | 0.25419 | 0.59049 | 0.105365 |
| 10 | tighten all | 0.25419 | 1.00000 | 0.53144 | 0.53144 | 0.53144 | 0.25419 | 0.53144 | 0.104352 |
| 11 | tighten all | 0.25419 | 1.00000 | 0.47830 | 0.47830 | 0.47830 | 0.25419 | 0.47830 | 0.103438 | reSpec values:
E: $0.9^{11} = 0.31381$
F: $0.9^7 = 0.47830$
P: $0.9^{12} = 0.28243$

*FIG. 8*

```
                        L49  50R x 6C
      0   1 dF      2 dE      3 dPR     4 dB     5 dPEB    6 dDd
      1  0.0000000 .166667  0.166667  0.666667 0.333333 0.333333
      2  0.0000000 .666667  0.0000000 .0000000 .833333  .000000
      3  0.0000000 .833333  0.833333  1.000000 1.000000 0.666667
      4  0.0000000 .500000  0.666667  .166667  0.500000 .833333
      5  0.0000001 .000000  0.333333  .500000  .0000000 .500000
      6  0.0000000 .333333  0.500000  .333333  .166667  0.166667
```

#pwindow 1("pw_dc5cd","L49","pw_mst","LHS343","cd_dc5a")

~90

```
            LHS343  343R x 8c
      0        1 A    2 B     3 C    4 D    5 E    6 F...
      1    1   0.005 -0.468 -0.733  0.291 -0.165 -0.019
      2    2   0.992  0.012 -0.992 -0.390 -0.059 -0.091
      3  314  -0.184 -0.117  0.488  0.130  0.173
      4  154   0.173  0.066  0.199 -0.015 -0.519
      5  241   0.170 -0.015  0.069 -0.086 -0.202
      6  220   0.329 -0.358 -0.148 -0.133 -0.135
         306  -0.140 -0.213 -0.624  0.160 -0.094
         692   0.049  0.376  0.007 -0.511  0.390
         196  -0.211  0.536  0.012  0.238  0.056
         235   0.017 -0.089  0.022  0.007 -0.814
         274  -0.310 -0.002 -0.715  0.610 -0.655
         545   0.481 -0.140 -0.024 -0.455  0.049
```

```
PW_MST  6R x 2C
0 factor    1 mean   2 stdev
1 focus     -0.20    0.600
2 expDose   11.19    1.119
3 PRThk     0.75     0.020
4 BARC      120.00   20.000
5 PEB       90.00    1.000
6 DevT      64.00    1.000
```

92 — # dis pw_dc5cd

```
PW_DC5CD 49R x 1C
0 mean    1 stdev    0 mean    1 stdev    0 mean      1 stdev
1 0.199502 0.016406  13 0.210442 0.042132  25 30198141 0.024265
2 0.202471 0.038783  14 0.212782 0.043284  26 0.205188 0.045237
3 0.200763 0.048054  15 0.204532 0.030229  27 0.200663 0.019051
4 0.200327 0.026851  16 0.206870 0.032515  28 0.199285 0.031152
5 0.204120 0.039771  17 0.208242 0.048108  29 0.201464 0.010944
``` col 2 of pw_dc5cd=log(col 1)  ~94
#krigeest()  —96
Name of kriging model> kpw_dc5cd
Tableportion of response values> col 1 of pw_dc5cd
Tableportion of design points> col 1 to 6 of L49
Tableportion of 1st derivative grid> col 1 to 6 of L8
Number of iterations> [4] 2
Ridge parameter> [0] 0.01
SVD tolerance> [5e-17] 1e-12
0.000813
...
0.00007
type exp(#kriger("kpw_dc5cd",1,1,1,1,1,1))
0.060705                                        ~98
    vs 0.060533
      :

*FIG. 10*

STATISTICAL PROCESS WINDOW DESIGN METHODOLOGY

BACKGROUND OF THE INVENTION

1. Field of the Invention

The invention is directed to the mass production of semiconductor devices. The invention is more particularly directed to the problem of perceiving interactions between interrelated process steps on a mass-production line and maintaining acceptable critical dimensions across each die of a plurality of mass-produced integrated circuit wafers.

CROSS REFERENCE TO RELATED PUBLICATIONS

The following publications are cited here for purposes of reference:

(1) S. Kaplan and L. Karklin, "Calibration of Lithography Simulator by Using Substitute Patterns," *Proceedings on Optical/Laser Mircrolitography VI*, SPIE 1927, pp. 847–858, 1993.

(2) C. Mack and E. Charrier, "Yield Modeling for Photolithography," *Proceedings of OCG Microlithography Seminar*, pp. 171–182, 1994.

(3) TMA DEPICT, *Two-Dimensional Process Simulation Program for Deposition, Etching, and Photolithography*, version 3.0, Technology Modeling Associates, Inc., Palo Alto, Calif., 1993.

(4) Mandel, J, *The Statistical Analysis of Experimental Data*, Chapter 12, Wiley, New York, 1964.

(5) Z. Krivokapic and W. D. Heavlin, "Predicting Manufacturing Variabilities for Deep micron Technologies: Integration of Process, Device, and Statistical Simulations," in *Simulation of Semiconductor Devices and Processes*, 5, S Selberherr, H Stippel and E Strasser, eds, pp. 229–232, Springer-Verlag, New York, 1993.

(6) W. D. Heavlin and G. P. Finnegan, "Dual Space Algorithms for Designing Space-filling Experiments," *Interface 1994*, Research Triangle, North Carolina, June 1994.

(7) B. D. Ripley, Spatial Statistics, pp. 44–75, Wiley, New York, 1981.

(8) A. B. Owen, "Controlling Correlations in Latin Hypercube Samples," *Journal of the American Statistical Association*, Vol. 89, No. 428, pp. 1517–1522, December 1994.

(9) W. D. Heavlin, "Variance Components and Computer Experiments," 1994 *ASA Proceedings, Section on Physical and Engineering Sciences*, Toronto, August 1994.

(10) A. R. Neureuther and F. H. Dill, "Photoresist Modeling and Device Fabrication Applications," *Optical and Acoustical Microelectronics*, pp. 223–247, Polytechnic Press, New York, 1974.

(11) F. H. Dill, J. A. Tuttle, A. R. Neureuther, "Modeling Positive Photoresist," *Proceedings*, Kodak Microelectronics Seminar, pp. 24–31, 1974.

(12) C. Mac, "Development of Positive Photoresists," *Journal of the Electrochemical Society*, Vol. 134, January 1987.

(13) M. Stein, "Large Sample Properties of Simulations using Latin Hypercube Sampling," *Technometrics*, Vol. 29, No. 2, pp. 143–151, May 1987.

(14) M. D. McKay and R. J. Beckman, "Using Variance to Identify Important Inputs," 1994 *ASA Proceedings, Section on Physical and Engineering Sciences*, Toronto, August 1994.

(15) William D. Heavlin and Luigi Capodieci, "Calibration and Computer Experiments," 1997 *American Statistical Association Proceedings, Section on Physical and Engineering Sciences*, Anaheim, August 1997 (scheduled for publication Summer 1998), pp. 58–63.

Each of the aforementioned publications is hereby incorporated by reference.

2. Description of the Related Art

Modern, high-density, integrated circuit devices are typically mass-produced with large numbers of critically-dimensioned features. In manufacturing, it is desirable to maintain the respective critical dimensions of each die within a plurality of mass-produced IC wafers constrained to certain respective values in order to assure desired operating speeds and operational characteristics of the produced IC.

Each feature on each IC die in a mass-produced wafer is the product of a succession of many process steps. Each process step is controlled by a combination of variable process parameters.

Different combinations of variations in process parameter can occur on a random basis across the numerous process steps of a mass-production line, on a die-by-die basis. This introduces noise into the uniformity of the product outflow of the production line. Sometimes a specific combination of process parameter deviations is relatively innocuous, sometimes it is not. It all depends on which process parameters are deviated for a given IC die and how their respective process steps interrelate to establish critical dimensions on that given die.

One example of such multiple, interrelated process steps that may be useful in understanding the interaction of factors in the present application, are those typically employed to define a pattern of conductive lines deposited across an insulator of an IC chip.

First, a dielectric layer of a generally non-planar form is created across the wafer. Such a non-planar dielectric layer may constitute the combined gate oxide and field oxide of a CMOS device. The non-planarity of the dielectric layer may alternatively be attributed to the non-planarity of underlying trenches, steps, mesas or other topographic features of the chip.

Next, a polysilicon or other conductive layer is deposited conformably on top of the dielectric layer. An anti-reflective coating (ARC) may be optionally deposited on the conductive layer to reduce undesired reflections in a following exposure step.

The deposition of the conductive layer and optional ARC layer is followed by a spinning-on or other deposition of a photoresist (PR) layer. The PR layer may or may not be planarized depending on process specifics.

The photoresist-coated wafer is then positioned within a stepper by an alignment mechanism. Tiled areas of the photoresist (PR) are successively exposed to a stepped pattern of resist-modifying radiation. After the step-wise exposure, the photoresist is "developed" by, for example, soft baking the wafer to induce cross-polymerization in the photoresist material and by subsequently dissolving away non-hardened portions of the photoresist with a specific solvent. The developed photoresist defines an etch mask.

The developed wafer is next etched, for example in a plasma etch chamber, so as to transfer the hardened image in the photoresist to the conductive layer. This produces a corresponding pattern of lines in the conductive (e.g., doped polysilicon) layer.

The photoresist mask is stripped off, or kept depending on process specifics, and further process steps follow. One example of a further process step is the selective implant of dopants into exposed semiconductor regions so as to create self-aligned source and drain regions at opposed sides of each conductive line, where the conductive line lies over gate oxide. The width of the conductive line at such a region of dopant implant defines the channel length of the formed IGFET transistor.

Within each of the above-described process steps, there are one or more variable physical attributes (or "process parameters") that control the final outcome of the produced device. Some process parameters may be adjusted by a line operator. Some are "set" by the design of the process equipment that is installed into the mass-production line.

Post-exposure development time and temperature are also subject to variance away from pre-established goal values. The diffusion length of the development chemistry may vary across a wafer. In a subsequent plasma etch, the variables can include: time, pressure, temperature, flow rate, and field-proximity effects resulting from the pitch and step profile of closely spaced mask features.

Because successive steps of IC production tend to be interdependent, a slight variation in parameter(s) of one process step can be magnified by a further variation in the parameters of a second process step to produce unacceptable numbers of defective product at the output end of the mass-production line.

For example, if PR (photoresist) thicknesses decreases slightly and the focal depth of the exposure optics also decreases slightly and the exposure dosage also decreases slightly during production of a first-sampled IC chip as compared to the corresponding process parameters for a second-sampled IC chip, the combined effect may be to significantly shift the position and intensity of the radiation exposure pattern relative to the photoresist layer during the production of the first-sampled IC chip. The second-sampled IC chip may come off the production line in acceptable form while the first-sampled chip comes out of the same mass-production line in defective form.

It is hard to pinpoint why mass-production yield for a given circuit layout on a given mass-production line becomes unacceptably low. The statistical variance of PR thickness across the production lot may be small. The statistical variance of focus across the production lot may be small. But the physical interaction between the two noise quantities can be such that the over all lithography process produces chips having a much larger variance in terms of critical dimensions. If the overall variance in final critical dimensions becomes too large, production yield may suffer significantly.

The interdependence of variance of a number of specific process steps is not easily perceived. It is not consistent across all steps, or even as between different product designs. By way of example, compare the layout of a densely packed memory circuit against the less regular layout of a random logic circuit. Some circuit layouts give rise to more so-called "field proximity effects" than others. (Field proximity effects occur in process steps such as exposure and plasma etch.) These field proximity effects can affect mass-production yield, as can many other factors.

In short, a fairly complex matrix of relationships exists between material deposition operations, mechanical operations, optical operations, thermal operations, chemical reactions and the specific layout of each product. It can turn out for each given layout that relatively small variances in certain, key process parameters have far more dominant effects on critical dimensions of the final product than do larger variances in other process parameters.

The goal of process engineers is then to determine the inherent trade-offs between the interdependent steps. In this endeavor, computer experimentation has aided the engineer by allowing distributions of key output parameters to be estimated. Generally, this is accomplished by varying selected inputs or noise factors, then by running computer code to simulate the variation likely to occur in manufacturing.

Three different process analysis and design approaches exist with respect to the description, modeling and modification of a given process based upon the variation likely to occur in the process. The first approach, generally referred to as system design (as defined by Genichi Taguchi in "Introduction to Quality Control," p.75 (Asian Productivity Organization, 1986)), comprises the general product architecture, schematic, functionality, and feature set. In the second approach, generally referred to as parameter design, as defined by Taguchi, id. at p. 76, nominal process settings are determined in order to minimize performance variability and costs. In a third approach, referred to as tolerance design (Taguchi, id. at p. 78), tolerance and specification limits are determined in order to achieve engineering objectives and minimize costs.

Computer experiments have emerged as one way engineers can model process designs using statistical methods to devise process parameters for semiconductor manufacturing. The models allow engineers to increase product yields by selecting variances in certain process factors such that the variance(s) of the output characteristic(s) does(do) not adversely affect product performance.

One modeling paradigm involves a description of the effect of a change in one process variation on the output of another relative to some common reference. For the purposes of this description, this paradigm will be defined as an "engineering process window." In one aspect, a process window is the inherent effect of a change in one parameter resulting in an effect on any other parameter which may be plotted in two (or perhaps more) dimensions. Stated still another way, in the case of two input parameters, a process window is any description of the tradeoff between the tolerance of one input parameter and the tolerance of other input parameters. Parameter design gives a process window which defines, as a function of input parameters $X_1 \ldots X_p$, the region in which the product performs in conformance to specifications. Tolerance design yields, for a given range of input parameters, the tolerances $X_1 \pm \Delta_1, \ldots, X_f \pm \Delta_f$ which allow the product to perform in conformance to its performance specification.

Various process windows may be defined by perturbing input factors by a fixed amount and determining the average desirability of response values over a grid of points, such as the number of variables which exist in a semiconductor fabrication process.

FIG. 1 illustrates an exemplary engineering process window. In FIG. 1, three linewidths 0.2925 μm, 0.325 μm, and 0.3575 μm resulting from a particular process are plotted based upon the required values of photoresist exposure (y-axis) and focus (x-axis) necessary to achieve each linewidth. Here, exposure times are defined in seconds, and focus in micrometers. In this figure, the "goal" linewidth is 0.325 μm, while the acceptable variation is 10% (or ±0.0325) yielding the narrow (0.2925) and wide (0.3575) linewidth limits. In this instance, a process window 30 is defined as an acceptable range of inputs of focus and exposure (as defined relative to the x-y axes) which yield a linewidth within this 10% range. The tolerance is the variation of one factor which yields the acceptable output within the window 30 relative to the other component's value.

In computer experimentation involving engineering process windows, calibration to realistic measurements is generally compared with computer implemented models. Data from the process may be sampled from sacrificial areas of actual processed substrates, with the sample data then used with empirical experiments or computer simulators (such as, for example, the DEPICT photolithography simulator available from Technology Modeling Associates of Palo Alto, Calif.) to provide a calibrated model of the process results.

FIG. 2 represents a contour plot comparing three different foci from a calibrated computer experiment (CAL), an un-calibrated exposure/focus matrix of a simulation (UNCAL), and measured experimental results, of the exposure latitude versus the depth of focus in a line-width definition process. As will be noted therein, computer experimentation both calibrated process simulations and computer experimental methods have a relatively close accuracy to actual results.

Process windows which compare results of altering two factors are relatively simple; the model deals with changes to one parameter which affect another parameter. The analysis becomes much more complex where a number of input factors are involved as in, for example, a cross-correlation of device parameters which are utilized in a semiconductor fabrication process and affect conductive line formation. Such factors include, and are abbreviated in this specification as follows:

| ABBREVIATION | FACTOR |
| --- | --- |
| annCD | annular exposure lighting diameter Critical Dimension ($\mu$m) (where annular exposure sources are used) |
| conv CD | conventional exposure lighting Critical Dimension ($\mu$m) (where conventional, shaped exposure sources are used) |
| ExpD | Exposure Dose (mJ/cm$^2$ $\mu$m) |
| Focus | Focus ($\mu$m) |
| mask CD | mask Critical Dimension ($\mu$m) |
| BARC | Base Anti Reflective Coating Thickness ($\mu$m) |
| PEB | Post Exposure Bake (minutes) |
| devT | Development Time (minutes) |

One descriptive method used successfully to compute variance parameters is known as analysis of manufacturing variance (AMV) and is set forth in *Heavlin*, "Variance Components and Computer Experiments," reference paper no. 9, cited above.

In analysis of manufacturing variance, the goal is to decompose the total variance of a process into components, one component associated with each input factor, and consistent with the variation to be anticipated in manufacturing. In a basic form of AMV, each noise factor is perfectly controlled, and the reduction in output variation noted. AMV allows for control of subsets of factors as well.

AMV in its simplest form comprises using Latin hypercube (LHC) sampling for factors $X_1 \ldots X_f$ in a computer simulation, calculating the total variance of the resulting values, and substituting the mean of each factor to calculate the reduction in variance from the total variance to estimate the contributions of the factors held constant. AMV analysis is illustrated in the table shown in FIG. 3A. In FIG. 3A, each $\lambda$ represents a noise factor for an input under determination where $\lambda=0$, perfect control (no variance) of the input factor is presumed. One factor per iteration is presumed perfect, and all other factors are allowed to vary.

FIG. 3B is a representation of the resulting quantitative AMV analysis for seven factors: exposure, focus, MaskCD (the exposure mask thickness critical dimensions), prThk, BARC, PEB, and devT for an exemplary sample. In FIG. 3B, $S_f$ is the LHC-based estimate of the variation attributable to factor f, $S_0^2$ the estimate of the total variation induced from all factors, and $S^2_{(f)}=S_0^2-S^2_f$ the component of the total variance that can be attributed to factor f. As shown in FIG. 3B, the AMV analysis results in a showing that the three most important factors contributing to the total variation in the process under consideration are the post exposure bake time (PEB), exposure time (Exp) and focus. Given the results of FIG. 3B, the conclusion drawn for the process considered therein is that the most attention should be given to controlling the post exposure bake time and exposure dosage variance in the corresponding manufacturing process under consideration. By way of example, driving exposure dosage variance down to zero provides a 38% improvement for the overall cross-reticle variance of a dense-line circuit layout.

AMV does, however, exaggerate the contributions from third order and higher order interaction terms. FIG. 4 illustrates a calculation of the bias of AMV's interaction term (i.e. the term being held constant). In FIG. 4, dots represent "1"'s and blanks, "0"'s; $\sigma_1-\sigma_5$ represent the standard deviation of the interaction terms; and $T_1-T_{12345}$ the iteration for each factor.

AMV nevertheless provides a strong methodology for deriving a quantitative description of the interaction between a number of factors. AMV does not provide an effective method for deriving the tolerances of each input factor which are suitable for maintaining the operating characteristics and yield of the final product. AMV quantifies the leading sources of variation, relative to the control assumptions on the noise factors. Based on computer experiments, applying AMV requires one to consider the costs of running the computer code, the non-linearities of the variance structure, and the number of factors under evaluation.

Another methodology related to AMV is described in U.S. Pat. No 5,646,870 and referred to therein as incremental leveraging. Initially, a predefined goal for variation is selected—for example 10%—and an evaluation of each factor made on this basis. Process parameters are selected one at a time and the variance of the selected process parameter is temporarily reset to zero. The noisy set of simulations is re-run and the new total variance is calculated and stored while still retaining the variance value of an original first run where none of the relevant variances were reset to zero.

FIGS. 5A and 5B illustrate the results of such an incremental leveraging process. As seen in FIG. 5A, the goal of the operation is to reduce the 3$\sigma$/mean value for the overall process from 0.20 to 0.10 (or 10% (logarithmic). In both FIGS. 5A and 5B, the x-axis increments represent a 10% incremental tightening of each input. In FIG. 5A, the 3$\sigma$/mean value on the y-axis represents the response of the process under consideration to the tightening of the factors.

In FIG. 5B, the first iteration of the leveraging algorithm pinpoints the variance of the focus as the tightening factor which provides the most beneficial improvement. Development time and mask CD remain constant over the first 5 increments (measured along horizontal axis). At the sixth increment, development time provides the most beneficial improvement. Best beneficial improvement from mask critical dimension variance does not arise until the 15th increment. The goal for the total variance of the production line is reached at the 12th increment, however, by flip-flopping tightenings the development time and the focus parameters.

At every increment along the x-axis, each noise factor is tightened in turn by ten percent. That noise factor giving the greatest reduction of CD variation is selected for permanent tightening. The predicted critical dimension from such tightening is plotted on the upper panel of FIG. 5A; the tightening multiplier for that noise factor is plotted on the lower panel of FIG. 5B.

In the illustration FIGS. 5A and 5B, incremental leveraging is performed over 20 improvement increments. For the first five increments, the factor with greatest leverage is focus, for the next two, development time, and so on. In total, focus is assigned 7 improvement increments and development time 5 before we achieve 10 percent (3 σ) linewidth control. We achieve this level by tightening focus by a factor of 0.48 ($0.9^7$) and development time by a factor of 0.59 ($0.9^5$).

Although the incremental leveraging techniques of FIGS. 5A and 5B are applied to variance tightening, a similar approach may be taken to selecting the best goal settings for the mean process parameters such as focus depth and photoresist thickness. Thus, if something goes wrong on the production line after new equipment has been installed, line operators can use the results of the incremental leveraging algorithm to determine which process parameter requires tweaking first and by how much.

Incremental leveraging has the advantage that it is good at suggesting one solution for input tolerance design. It does not, however, provide a mechanism for flexibility in allowing more than the one solution it provides for changing the tolerance constraints of the factors in the process under consideration.

SUMMARY OF THE INVENTION

Hence, an objective of the invention is to allow process engineers to determine tolerances for a multitude of factors.

A further objective of the present invention is to provide an evaluation method for process engineers to make qualitative judgements about the manufacturability of certain processes based on models of the output given a variety of inputs to the process.

Yet another object of the invention is to improve yields in multi-faceted manufacturing processes, and particularly semiconductor manufacturing applications.

In one aspect, the invention, roughly described, comprises a method of fabricating a multi-component semiconductor device assembly. This method is comprised of the steps of first defining a nominal semiconductor manufacturing process. This nominal process has a plurality of process steps used to produce the device assembly. The nominal process also includes a number of process input factors $X_1-X_f$, which, when perfectly controlled to meet the nominal process settings for such factors, produce a device assembly with defined operating characteristics. The input factors each have a distribution of acceptable tolerances which are acceptable inputs to the process and which result in the defined operating characteristics. The method further includes evaluating the nominal process by representing the variability of the response of the operating characteristic as a function of the current variability of at least one of said factors and at least one tightening factor, evaluating said input factors subject to a variety of tightening factors array over $[0,1]^f$, and modeling the output using an interpolation function to determine suitable tolerance models impacting control of one or more of said input factors. The method also includes defining a toleranced process by applying at least one of the models to the manufacturing process steps by setting the value of said components and manufacturing the device using the toleranced process.

More generally, the method of the invention can be applied to any manufacturing process wherein the output is dependent on a process having a number of input factors which are subject to variation. In particular, a method of defining a toleranced process based on a nominal process having a plurality of components, each component having a mean and standard deviation; comprising the steps of: representing the variability of the response of a system to the current variability of at least one of said factors and at least one tightening factor; evaluating said components against a schedule of tightening factors in an array; modeling the output of the evaluation using interpolation to determine a mathematical function defining the toleranced process; and applying at least one of the models to a fabrication system to complete the model.

BRIEF DESCRIPTION OF THE DRAWINGS

The invention will be described with respect to the particular embodiments thereof. Other objects, features, and advantages of the invention will become apparent with reference to the specification and drawings in which:

FIG. 3A is an illustrative table representing the factor analysis utilized in analysis of manufacturing variance methodology.

FIG. 3B is a table representing the output of an analysis of manufacturing variance analysis on a given process.

Figure 4:
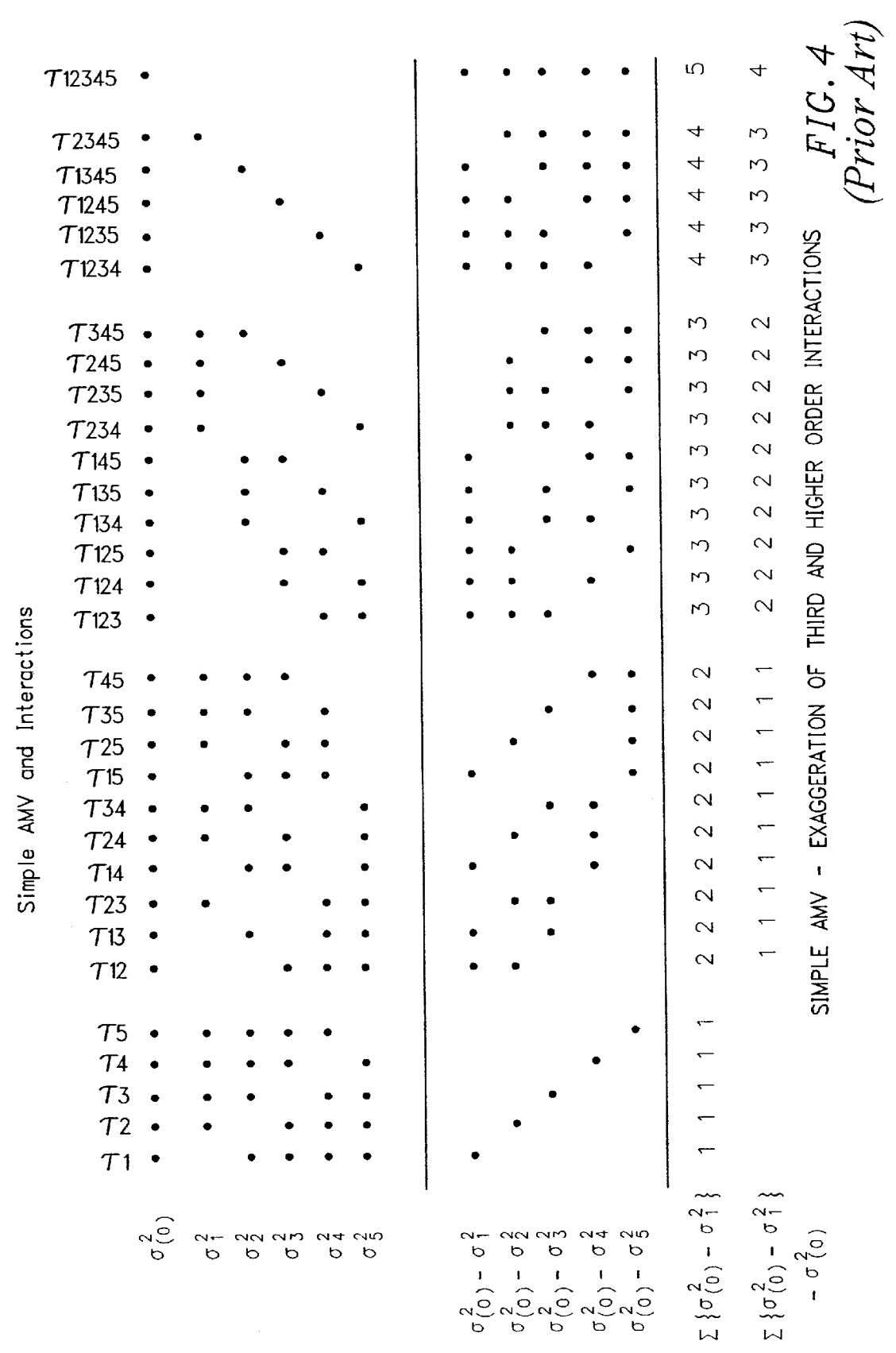

FIG. 4 is a table illustrating the effect of higher order interaction terms in an analysis of manufacturing variance analysis.

FIGS. 6A and 6B illustrate the input, and output, respectively, of an incremental averaging algorithm process over 210 intervals.

FIG. 8 is an interactive dialog table illustrating a portion of the method of the present invention as set forth in FIG. 8.

FIG. 10 is a graphical representation of the command instructions and matrix input for the method set forth in FIG. 9.

DETAILED DESCRIPTION OF THE PREFERRED EMBODIMENTS

Figure 1:
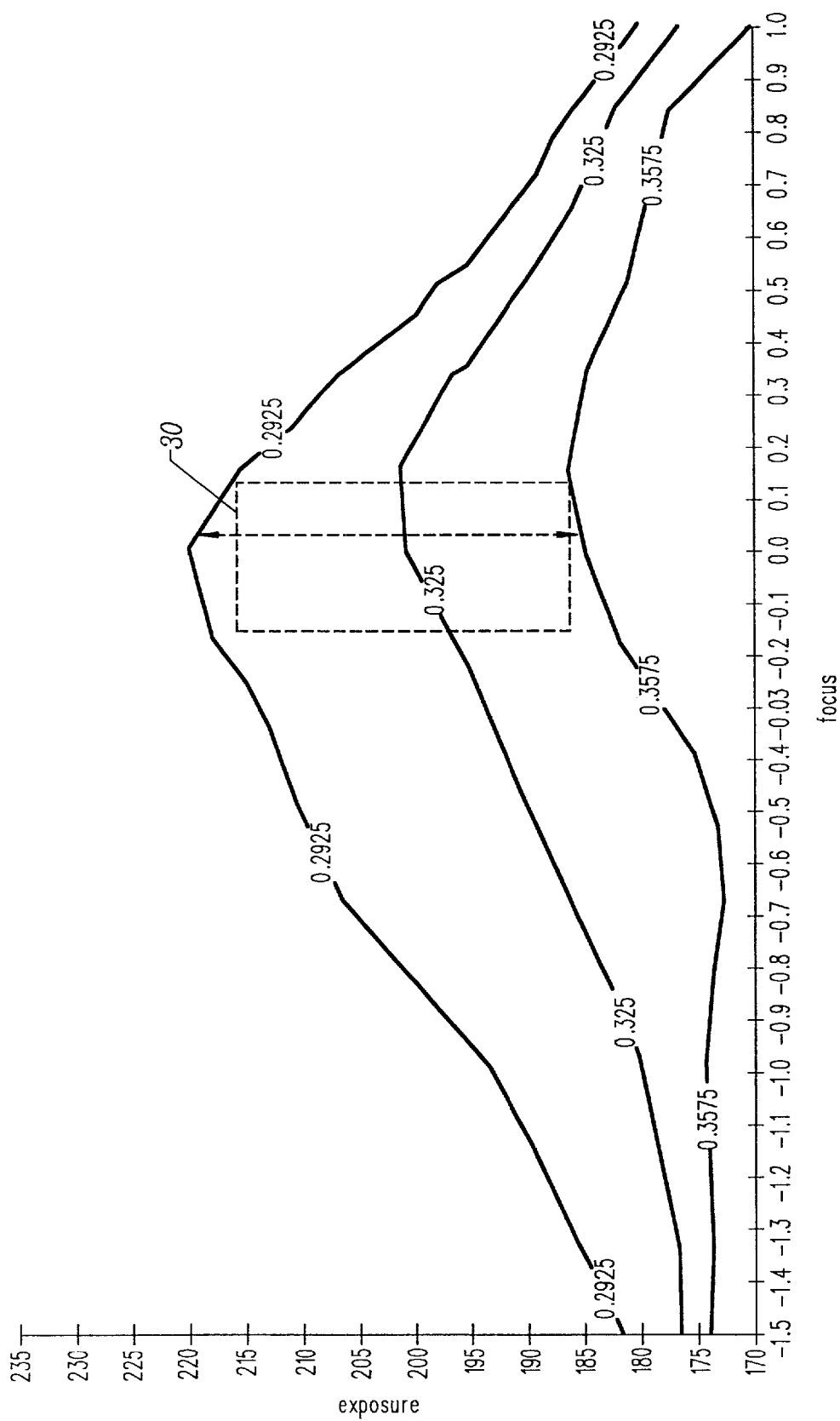
FIG. 1 is a plot representing the interaction between the factors of exposure and focus in a process defining a semiconductor device linewidth relative to three actual linewidths.
Figure 2:
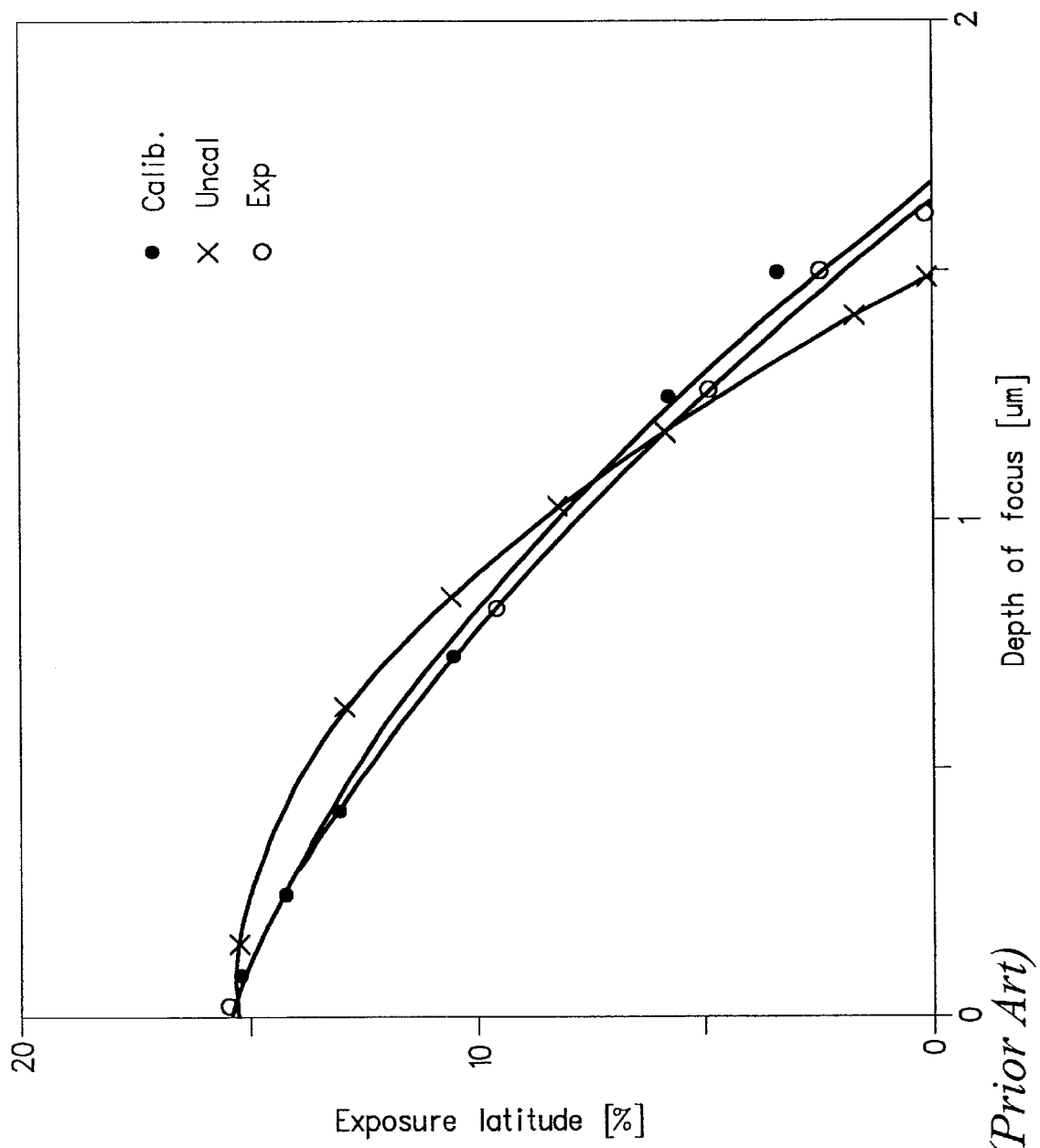
FIG. 2 is a contour plot of the exposure latitude versus depth of focus comparing a computer experimental model, actual measured results, and a computer simulation.

In manufacturing processes, such as those utilized for manufacturing a semiconductor device, imperfect control of input variables propagates through the manufacturing process to induce variation in the manufactured device, and in response variables describing the device. Where there are a number of process inputs, one can define the relative importance of such inputs, and more than one set of input tolerances which will meet the desired response. This means that there are trade-offs in the control tolerances, or required distributions of standard deviations, among the various input factors. While process windows represent one-to-one trade-offs, a more generalized model is required to consider all sets of input tolerances.

While the method of the present invention will be described herein with respect to a semiconductor manufacturing process, it should be recognized that the method of the present invention may be applied to any process wherein a number of process variables affect the output variance of the manufactured product.

In accordance with the present invention, incremental leveraging methodology is utilized as a basis to define a statistically based, process window algorithm wherein the response variability of a process is represented as a function of the tolerances of each variable. In brief, one utilizes the tolerance variations defined in the aforementioned algorithms as inputs to determine, for any number of process variables, the effect of varying the tolerance of each factor on the tolerances of other factors under consideration relative to a response factor for the entire process. This algorithm may be performed in a computer and have an output provided to a process engineer who may then determine optimal modifications to the nominal process under consideration to derive a toleranced process.

In general, the method of the present invention comprises: defining a nominal process; evaluating F input factors $\{X_f; f=1, \ldots, F\}$ which affect the output of the nominal process; and defining, as a result of the evaluation, a toleranced process having an output response less susceptible to variance in the input factors. In one aspect, the invention comprises a method for manufacturing a semiconductor device which comprises: defining a nominal semiconductor manufacturing process; evaluating a subset of factors controlling process steps in the manufacturing process; modifying the process to reduce the effect of large-effect factors by constraining the control on such factors and/or loosening control small-effect factors; and manufacturing a semiconductor device based on the modified process.

In brief, the evaluation portion of this method comprises: representing the variability of the response of the process as a function of the factors' current variability and selected tightening factors; performing an evaluation where the tightening factors are varied using an orthogonal array, varying the factors over $[0,1]^F$; and modeling, using kriging interpolation, a neural network or equivalents, to determine moments or other statistics of a distribution of the process for given changes in the constraints of each factor.

The method of forming the semiconductor device in accordance with the present invention results in better planning of next-generation equipment requirements and ultimately in improved product yields as the considered factors are optimized for the given process by allowing modification of the nominal process factor inputs based on the model resulting from the evaluation step.

By way of example, a typical semiconductor mass-production line which is part of an overall wafer processing system may include: (1) a station for coating each wafer with material layers such as the anti-reflective coating and photoresist layers; (2) a station for exposing the material layers (the photoresist layer) to a radiation pattern; (3) a station for developing each exposed wafer; and (4) a station for etching each developed wafer. The method of the present invention allows tweaking of the process at any one or multiples of such stations.

Typically, each post-etch wafer lot is moved further downstream for further processing (e.g., dopant implant) in accordance with well known techniques. Before such further processing, sample wafers from each post-etch wafer lot may be sampled to determine critical dimensions in order to calibrate the computer model of the method of the present invention.

The evaluation method of the present invention may be performed in an independent computer unit or can be a module within a computer that also carries out functions of other described or to-be described modules. The output of the model may be used by the process engineer in possession of other data, such as cost factors, to define constraints and make choices for altering the semiconductor manufacturing process to determine which constraints to confine or relax.

According to the evaluation portion of the method of the invention, a statistical process window evaluation is used over a set of F individual factors. For each component, the simulation is used to generate a statistical distribution of each fit-determining parameter. The distributions have a mean and a deviation about the mean, and also between manufacturing-capability-defined lower and upper limits, e.g., mean ±3 standard deviations.

Figure 5A:
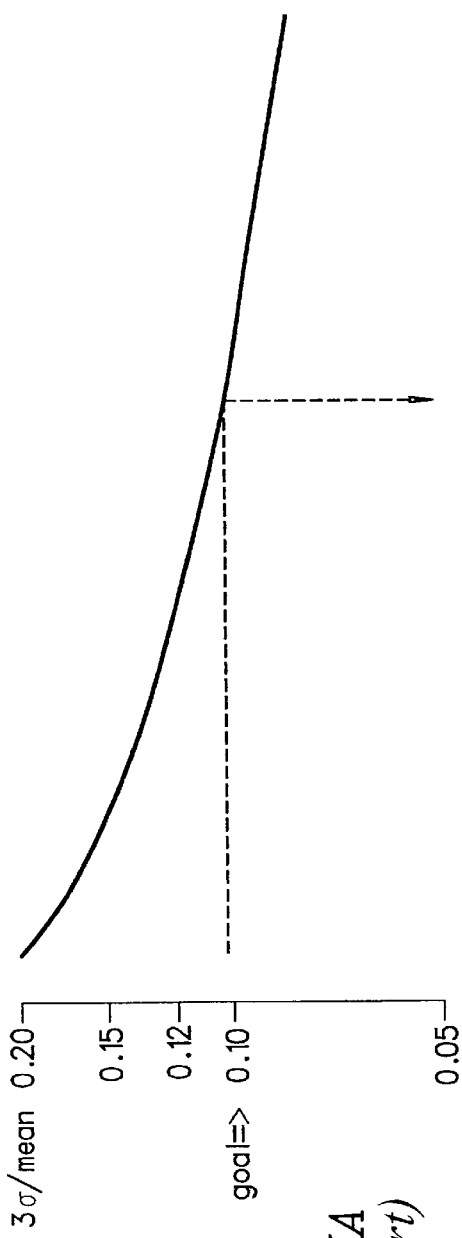
FIGS. 5A and 5B illustrate incremental leveraging algorithm analysis of a manufacturing process.
Figure 5B:
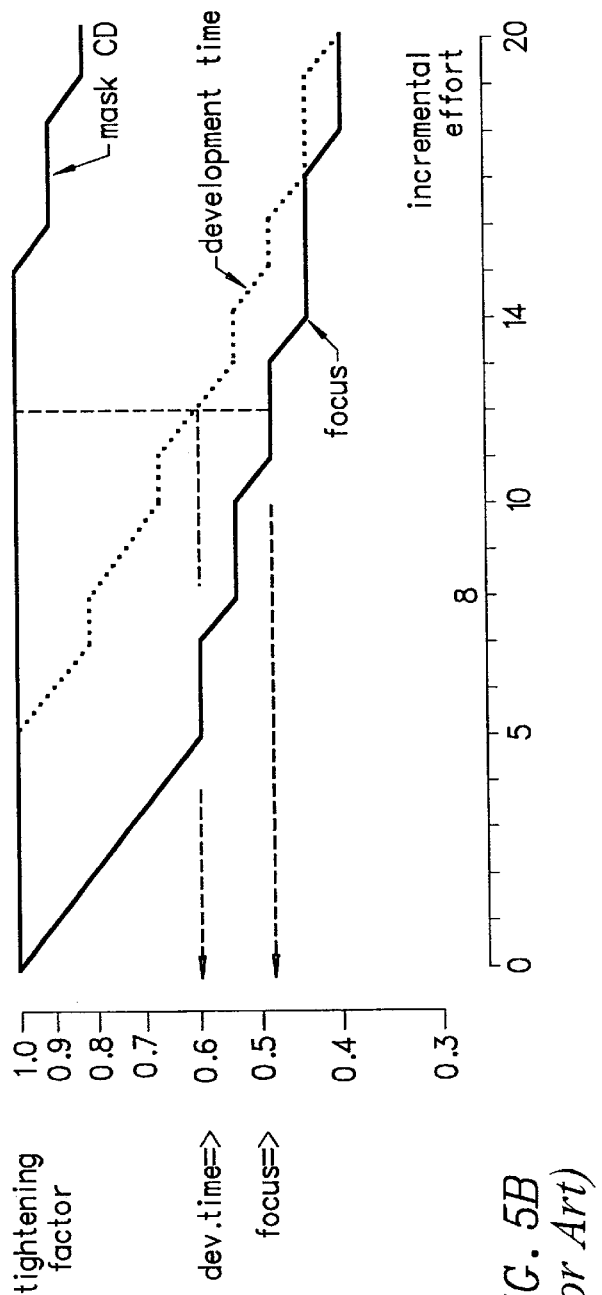

FIGS. 6A and 6B illustrate the output of the incremental leveraging calculation for a given simulation. The input table 40 includes the nominal mean and the standard deviation values for seven input factors considered in this example which comprises line width definition process, similar to that described above and in U.S. Pat. No. 5,646,870. Each factor is assigned an effort of 0.9, reflecting that, for this exercise, the design goal is a 10% incremental change. It should be recognized that other effort factors may be utilized in accordance with the present invention. The factor of a 10% increment is selected based upon common practice in the industry. The output table 50 shown in FIG. 6B comprises a calculation in accordance with the incremental leveraging algorithm described with respect to FIGS. 5A–5B, over 210 increments. Column 1 of output table 50 shows the resulting weighting of weighted tolerance factor for each of the seven factors analyzed. For example, for incremental row 205, the focus factor has a standard deviation of 0.06960, and the factors of exposure (ExpD), focus and post exposure bake (PEB) are shown to have the greatest contribution over these increments. Incremental leveraging assigns the focus parameter 7 increments, exposure 11 increments, and PEB 12 increments. This yields tightening factors for ExpD of $0.31381=(0.9)^{11}$, for Focus of $0.47830=(0.9)^7$, and for PEB of $0.28243=(0.9)^{12}$. This output of the incremental leveraging algorithm provides the tightening factor starting points for determining the matrix of tightening factors used in the evaluation portion of the present invention.

Figure 7:
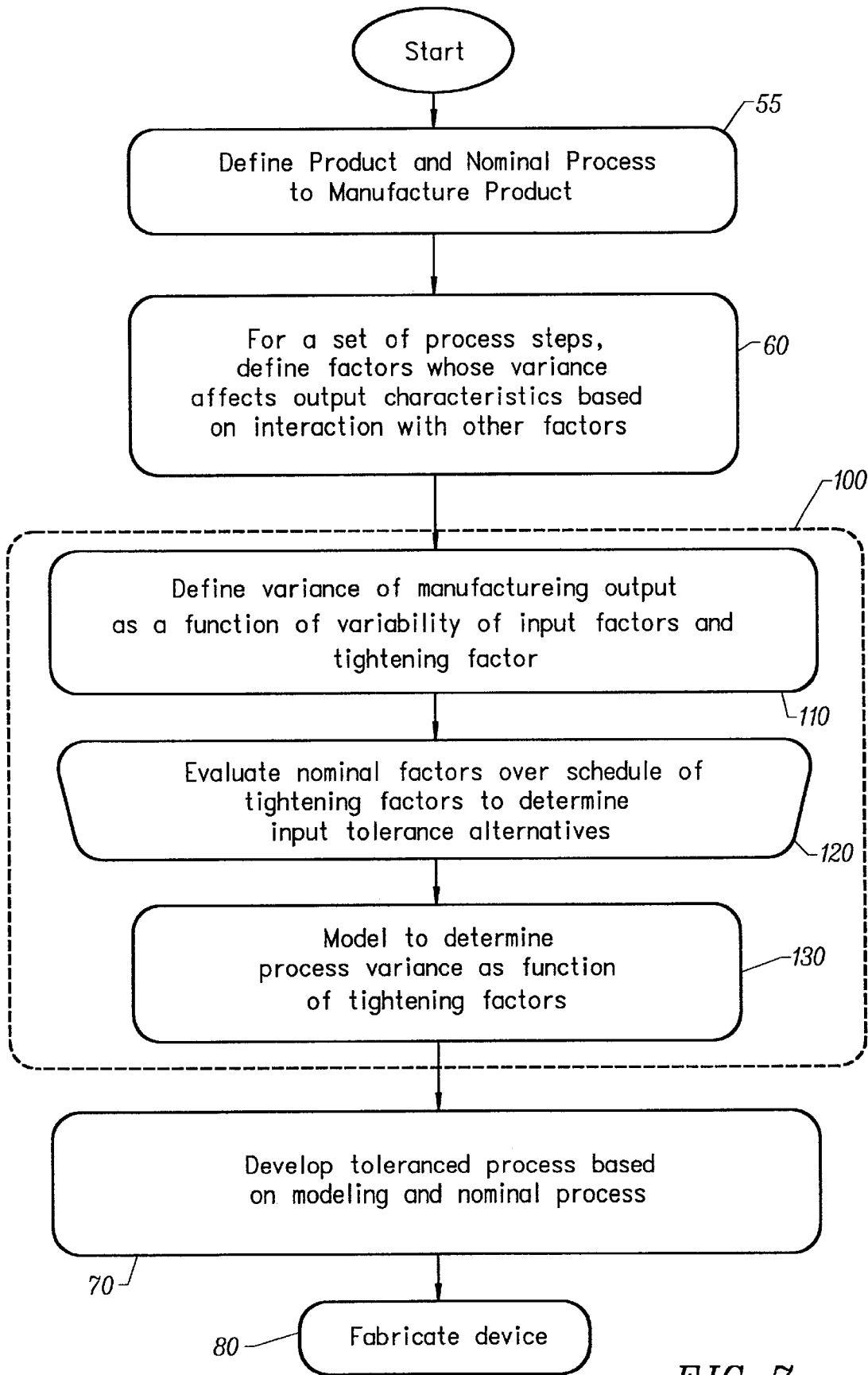
FIG. 7 is a flow chart depicting one embodiment of the method of the present invention.

FIG. 7 is a flowchart depicting, in one aspect, a method in accordance with the present invention. At step 55, a manufacturing process under consideration is defined based on the particular characteristics of the product to be manufactured. In the case of a semiconductor device, this process will include a number of process steps as described herein. The process defined to produce the product is generally referred to as the "nominal" process and results in process steps, each process step having one or more input factors, such as those factors set forth above with respect to the semiconductor manufacturing process.

As shown at step 60, for a set of process steps, the input factors whose variance affects the output yield of the process based on their interaction with other factors are defined. Each input factor will have a nominal or mean value, and a standard deviation about the mean value. The standard deviation can be an actual deviation during the process or a simulated deviation for purposes of the evaluation of the present invention.

Step 100, defined in dashed lines and comprising several sub-steps, comprises the evaluation portion of the method of the present invention. The evaluation portion 100 can comprise a set of instructions which are processed by a computer, in one or more modules as described above, designed specifically to implement the evaluation based on the input factors provided to it.

In one embodiment, as depicted in FIG. 7, the evaluation portion 100 of the method of the present invention comprises, at step 110, defining the variance of the manufacturing output—the product produced—as a function of the variability of the input factors and tightening factors applied to each input factor. Once so defined, at step 120, an evaluation is performed by varying the tightening factors to determine alternative input tolerances which yield acceptable manufacturing outputs. Finally, at step 130, the evaluation is modeled to determine the process variance as a function of the tightening factors.

Once the evaluation is performed, at step 70, the nominal manufacturing process may be varied to derive a toleranced manufacturing process by implementing a tolerance model. Finally, the toleranced process is used to fabricate a device at step 80.

Figure 9:
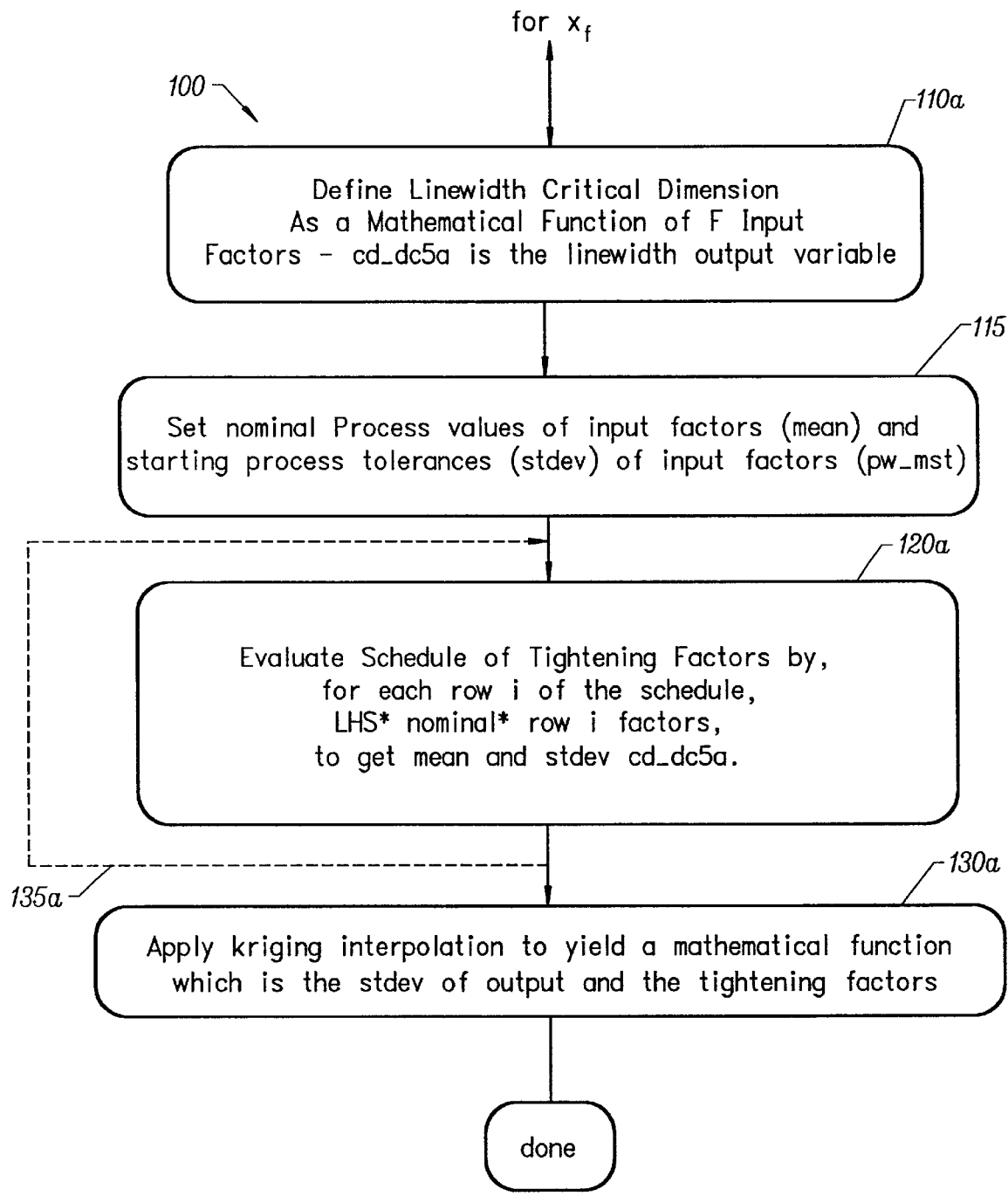
FIG. 9 is a flow chart illustrating the statistical process window evaluation portion of the method of the present invention.

FIG. 8 shows an interactive dialog for a statistical process window algorithm that is used in the evaluation portion of the present invention. FIG. 9 presents a generalized description of the evaluation algorithm of the present invention which should aid in understanding the more specific description to follow. In general, the dialog depicts the interaction between terms necessary to loosen the tightening factor for focus from an interactive leveraging-derived value to 1.0, and the effect on the tightening factors of all other factors under evaluation. It should be noted that while focus is illustrated as the factor under consideration, other factors, or multiple factors, may be considered.

The tightening factors for exposure, focus and post expose bake are calculated tightening factors based on an incremental leveraging algorithm, as described above. All other factors are assigned a factor of $1.0=(0.9)^0$. A resulting control factor is computed. The control factor reflects the $3\sigma$/mean value as computed in an incremental averaging algorithm. Next, the tightening factor for focus is relaxed (from 0.47830 to 0.081 (at col. 2)), and all other factors except ExpD and PEB tightened, and the resulting control recalculated. As will be noted, the control factor increases to 0.11536. Next all factors, including ExpD and PEB are tightened, and the control factor again calculated. This process continues as illustrated in FIG. 8.

The goal of the aforementioned dialog can be seen by reviewing the subsequent rows 4–11 wherein the focus contribution is relaxed to zero increments $(0.9)^o=1.0$ in row 6, as all other factors are tightened until the resulting control factor achieves proximity with the initial, incrementally-derived control factor in row 1 of the dialog.

Comparing the statistical process window dialog with incremental leveraging, incremental leveraging gives an output for each factor of $(\sigma)(\lambda)^f$ for each tolerance. With SPW, the resulting control allows one to relax or modify any number of the factors (not merely the single focus factor identified in the dialog of FIG. 8), to achieve the resulting control value. It should be noted that in the method of the present invention, each of the process factors may be varied relative to external considerations, such as cost or ease of control over the factor. In the aforementioned example of FIG. 8, the noise factor is selected at (0.9). In the method of the present invention, the noise factor is varied over $[0,1]^F$ (mathematically, the interval from 0 to 1, inclusive) in an orthogonal array by means of a computer simulation as described below.

The evaluation portion 100 of the method of the present invention will be described with reference to FIGS. 9 and 10. FIG. 9 is a flow chart of the evaluation algorithm 100 of the present invention FIG. 10 is a representation of the command instructions and mathematical inputs of the evaluation method of the present invention.

FIGS. 9 and 10 consider, for example, a lithography portion of a semiconductor manufacturing process. A nominal lithography process has been determined by process engineers, based on the device to be manufactured, and the nominal process will be evaluated in accord with the inventive method.

As shown in FIG. 9, process step 110a consists of defining a resulting linewidth critical dimension as a mathematical function of a number (f) of input factors. The result is an output variable (cd_dc5a) which is the goal of the linewidth definition process (e.g., a linewidth). In one aspect of the present invention, this definition step 110a can be performed by a kriging interpolation in accordance with the approach outlined in B. D. Ripley, "Spatial Statistics," article 7 set forth above, or by suitable fast computer simulation techniques. Essentially, step 110a can be decomposed into the substeps of: building a kriging model to determine the response dimension relative to the input factors; and calibrating the model. The calibration adjustment may be performed in accordance with the teachings of W. D. Heavlin and L. Capodieci in "Calibration and Computer Experiments," cited as article 15, above, wherein simulated critical dimensions are compared against empirical critical dimensions. The calibration model may result from either kriging interpolation or use of a neural network in accordance with the teachings of the aforementioned reference. The output critical dimension used in the method of the present invention (cd_dc5a) is the result of the calibration model and the simulation critical dimension resulting from the kriging model.

In FIG. 10, the evaluation steps 110a, 115 and 120a are represented as a single command line 90 which may be used to call the functions or tables described herein. The tables and arrays described with respect to FIG. 9 are graphically represented. In FIG. 9, at step 115, the nominal process values of the input factors and the starting process tolerances are defined for input to the evaluation portion of the method. The input factors (mean) and variances (stdev) are set forth in a table (pw_mst). The nominal process targets at the input factors are the starting (wide-standard deviation, current generation) process tolerances of the input factors.

The current generation values of the input factors are then used to build a data set for the evaluation portion of the method of the present invention.

At step 120a, a schedule of tightening factors (L49 as illustrated in FIG. 10) is then evaluated against the defined output variable (cd_dc5a), which is subjected to a Latin hypercube sampling (LHS343) for each row of the schedule of tightening factors in accordance with the following pseudocode:

loop "schedule" (L49)
  for row i of schedule
    copy LHS$_i$ from LHS
      loop j
        Col j of LHS$_i$=mst(mean)(j)+(Col j of LHS$_i$)*mst (std)(j)*sched(i,j)
      end loop j
    LHS$_i$ (343 rows)→cd_dc5a
    m(i)=mean of LHS$_{343}$→cd_dc5a
    s(i)=stdev of LHS$_{343}$→cd_dc5a
end loop i Step 128 results in an output (pw_dc5cd as represented in FIG. 10), which is a mean and standard deviation table with a number of rows (49) corresponding to the number of rows (49) in the schedule (L49) of tightening factors. The output pw_dc5cd is then used in a kriging interpolation at step 130a, to yield a mathematical function which is the standard deviation of the output response and the tightening factors.

The output of the kriging interpolation shall be referred to herein as the "statistical process windows (SPW) function." The SPW function is the standard deviation of the output response as a function of each input factor and a corresponding tightening factor for the particular input factor.

As represented in FIG. 10, at step 94, the log of col. 1 (stdev) of pw_dc5cd is taken to exaggerate small values of the output variance. As shown in FIG. 10, in the particular kriging estimation which is utilized in the present invention—kpw_dc5cd, two iterations are used with a ridge (a.k.a. nugget) parameter of 0.01.

At step 98 of FIG. 10, the exponent taken in accordance with conventional statistical techniques to invert the log function of step 94.

As shown at step 98, the kriging interpolated estimate is a deviation of 0.060705, compared to a directly calculated value of 0.060533 for one particular point of interest.

An additional mode of method of the invention is shown in FIG. 9 wherein, at line 135a, a process engineer may enter into an interactive mode with the method of the present invention to propose alternative schedules of tightening factors based on external factors such as the cost of controlling a particular factor or other considerations, and determine the resulting output based on this proposed schedule of tightening factors.

In still another aspect of the invention, AMV or the incremental leveraging algorithm can be used with the statistical process windows function. The result is a faster evaluation than using AMV alone, but one which is less accurate than the above proposed methodology.

The many features and advantages of the present invention will be readily apparent to one of average skill in the art. The method of the present invention provides a model which can be used in processing devices based upon computer simulated results of processes, or on empirically derived models of each process. No specification of a cost-of-tolerance function is required, thereby simplifying application of the method to various processes or sub-processes in device manufacturing.

The method of the present invention utilizes an evaluation process which makes explicit the trade-off in the control requirements amongst various manufacturing steps, and provides a quantitative analysis of this trade-off for use by process engineers in developing the fabrication process. Process engineers are provided with an explicit role for engineering judgment by the quantitative description of each trade-off in the process.

Obvious modifications to the method of the invention will be apparent to those of average skill in the art. For example and without limitation, at step 130a, other methods of modeling the output of step 120a, such as utilizing a neural network, are contemplated. All such modifications are intended to be within the scope of the invention as defined by the claims.

What is claimed is:

1. A method of fabricating a multi-component semiconductor device assembly, comprising:
   (A) defining a nominal semiconductor manufacturing process having a plurality of process steps which produce the device assembly, the nominal process including a number of process input factors $X_1$–$X_f$ which, when perfectly controlled to meet the nominal process settings for such factors, produce a device assembly with defined operating characteristics, the input factors having each having a distribution of acceptable tolerances which are acceptable inputs to the process which result in the defined operating characteristics;
   (B) evaluating the nominal process by:
      (1) representing the variability of the response of the operating characteristic as a function of the current variability of at least one of said factors and at least one tightening factor;
      (2) evaluating said input factors subject to a variety of tightening factors where the tightening factors are varied over $[0,1]^f$ using an array;
      (3) modeling the output using an interpolation function to determine suitable tolerance models impacting control of one or more of said input factors;
   (C) defining a toleranced process by applying at least one of the models to the manufacturing process steps by setting the value of said components; and
   (D) manufacturing the device using the toleranced process.

2. The method of claim 1 wherein said step (B)(1) comprises the sub-steps of:
   defining an output response based on a matrix of said factors; and
   calibrating said output response based on empirical data of the output response.

3. The method of claim 2 wherein said sub-step of defining comprises utilizing a kriging interpolation.

4. The method of claim 2 wherein said sub-step of defining comprises utilizing a neural network.

5. The method of claim 1 wherein said step (B)(2) comprises:
   for the array of tightening factors, evaluating for each row of the array, a Latin hypercube sample of, for each column of the sample, the mean and standard deviation of each input factor, taking the mean of the Latin hypercube sample output of each row of the array in the standard deviation of the Latin hypercube sample for each row of the array.

6. The method of claim 1 wherein said step (B)(3) comprises applying a kriging interpolation to the output of said step (B)(2).

7. The method of claim 1 wherein said step (B)(3) comprises utilizing a neural network on the output of step (B)(2).

8. The method of claim 1 wherein steps (B)(2) and (B)(3) are repeated based on empirical choices made according to external factors of the nominal process.

9. The method of claim 1 wherein at least one of the tightening factors is selected by a user.

10. The method of claim 9 wherein steps (B)(2) and (B)(3) are repeated, wherein at least one of the tightening factors is selected by the user.

11. The method of claim 1 wherein said step (B)(1) comprises:
   simulating an output response as a function of the input factors to determine an output variable;
   calibrating the simulation by comparing empirically determined output responses as a function of selected factors to simulated output responses generated by the simulation.

12. The method of claim 11 wherein the step of simulating comprises using a kriging interpolation.

13. A method of fabricating a multi-component assembly, the method including at least components X1–Xf wherein each of said components X1–Xf has a distribution of acceptable tolerances within which the method will produce the multi-component assembly in an acceptable fashion, comprising:
(A) defining the nominal values of each component;
(B) evaluating the method by:
   (1) defining the variance of at least one critical dimension of the assembly as a function of the variance of the components and a plurality of tightening factors, one tightening factor associated with each component;
   (2) analyzing the nominal components by comparing a Latin hypercube sampling of the nominal components against a schedule of tightening factors;
   (3) modeling the analyzed components to define the variance of the output as a function of the components and the tightening factors; and
(C) manufacturing the multi-component assembly by performing the method and controlling ones of said components based on the output of step (B).

14. The method of claim 13 wherein said step (B)(1) comprises the sub-steps of:
defining an output response based on a matrix of said components; and
calibrating said output response based on empirical data of the output response.

15. The method of claim 14 wherein said sub-step of defining comprises utilizing a kriging interpolation.

16. The method of claim 14 wherein said sub-step of defining comprises utilizing a neural network.

17. The method of claim 13 wherein said step (B)(2) comprises:
for the schedule of tightening factors, evaluating for each row of the schedule, a Latin hypercube sample of, for each column of the sample, the mean and standard deviation of each component, taking the mean of the Latin hypercube sample output of each row of the schedule in the standard deviation of the Latin hypercube sample for each row of the schedule.

18. The method of claim 13 wherein said step (B)(3) comprises applying a kriging interpolation to the output of said step (B)(2).

19. The method of claim 13 wherein said step (B)(3) comprises utilizing a neural network on the output of step (B)(2).

20. The method of claim 13 wherein steps (B)(2) and (B)(3) are repeated based on empirical choices made according to external factors.

21. The method of claim 13 wherein said step (B)(1) comprises:
simulating an output response as a function of the components to determine an output variable;
calibrating the simulation by comparing empirically determined output responses as a function of selected components to simulated output responses generated by the simulation.

22. The method of claim 21 wherein the step of simulating comprises using a kriging interpolation.

23. A method of defining a toleranced process based on a nominal process having a plurality of components, each component having a mean and standard deviation, comprising the steps of:
(A) representing the variability of the response of a system to the current variability of at least one of said components and at least one tightening factor;
(B) evaluating said components against a schedule of tightening factors in an orthogonal array;
(C) modeling the output of the evaluation using interpolation to determine models defining the toleranced process; and
(D) applying at least one of the models to a fabrication system.

24. The method of claim 23 wherein said step (A) comprises:
defining an output response based on a matrix of said components; and
calibrating said output response based on empirical data of the output response.

25. The method of claim 24 wherein said step of defining comprises utilizing a kriging interpolation.

26. The method of claim 24 wherein said step of defining comprises utilizing a neural network.

27. The method of claim 23 wherein said step (B) comprises:
for the schedule of tightening factors, evaluating for each row of the schedule, a Latin hypercube sample of, for each column of the sample, the mean and standard deviation of each component, taking the mean of the Latin hypercube sample output of each row of the schedule in the standard deviation of the Latin hypercube sample for each row of the schedule.

28. The method of claim 23 wherein said step (C) comprises applying a kriging interpolation to the output of said step (B).

29. The method of claim 23 wherein said step (C) comprises utilizing a neural network on the output of step (B).

30. The method of claim 23 wherein steps (B) and (C) are repeated based on empirical choices made by external factors.

31. The method of claim 23 wherein said step (A) comprises:
simulating an output response as a function of the components to determine an output variable;
calibrating the simulation by comparing empirically determined output responses as a function of selected components to simulated output responses generated by the simulation.

32. A method, comprising:
(A) defining a product and a nominal process comprising a series of process steps, the nominal process including input factors for the steps suitable for producing the product;
(B) defining a set of the input factors whose variance affects the output characteristics of the process for a set of process steps;
(C) defining the variance of the manufacturing output of the nominal process as a function of the variability of the input factors and tightening factors;
(D) evaluating the input factors by applying a schedule of tightening factors to determine the tolerances of the input factors relative to the output factor;
(E) modeling the evaluation to determine process variance as a function of the tightening factors;
(F) defining a toleranced process for producing the product; and
(G) producing the product by performing the toleranced process.

* * * * *